US012745273B2

(12) United States Patent
Uziel et al.

(10) Patent No.: US 12,745,273 B2
(45) Date of Patent: Sep. 22, 2026

(54) FLEXIBLE GAP DURATION FOR NON-TERRESTRIAL NETWORK (NTN) COMMUNICATIONS

(71) Applicant: QUALCOMM Incorporated, San Diego, CA (US)

(72) Inventors: Lior Uziel, Hod Hasharon (IL); Guy Wolf, Rosh Haayin (IL); Shai Spiegelblat, Raanana (IL); Gideon Shlomo Kutz, Ramat Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 340 days.

(21) Appl. No.: 18/624,020

(22) Filed: Apr. 1, 2024

(65) Prior Publication Data

US 2025/0310977 A1 Oct. 2, 2025

(51) Int. Cl.

| | |
|---|---|
| ***H04W 72/51*** | (2023.01) |
| ***H04L 5/00*** | (2006.01) |
| ***H04W 72/0446*** | (2023.01) |
| ***H04W 84/06*** | (2009.01) |

(52) U.S. Cl.

CPC ........... *H04W 72/51* (2023.01); *H04L 5/0053* (2013.01); *H04W 72/0446* (2013.01); *H04W 84/06* (2013.01)

(58) Field of Classification Search

None

See application file for complete search history.

(56) References Cited

U.S. PATENT DOCUMENTS

2014/0274117 A1* 9/2014 Carmel .................... H04L 67/52 455/456.1
2023/0007523 A1* 1/2023 Fu ....................... H04B 7/18504
2023/0337035 A1* 10/2023 Cao ....................... H04W 24/10

(Continued)

OTHER PUBLICATIONS

3GPP TR 38.821: "3rd Generation Partnership Project; Technical Specification Group Radio Access Network, Solutions for NR to Support Non-terrestrial Networks (NTN) (Release 16)", 3GPP TR 38.821 V16.2.0, Mar. 2023, pp. 1-140.

(Continued)

*Primary Examiner* — Jenee Holland

(74) *Attorney, Agent, or Firm* — Dinsmore & Shohl LLP

(57) ABSTRACT

Certain aspects of the present disclosure provide techniques for wireless communications by a first apparatus. A method includes communicating, during a first time period, with a second apparatus according to a first minimum gap duration between uplink and downlink communication resources configured for communication between the first apparatus and the second apparatus, wherein the first minimum gap duration is based on a relative distance between the first apparatus and the second apparatus being within a first distance range during the first time period; and communicating, during a second time period, with the second apparatus according to a second minimum gap duration between uplink and downlink communication resources configured for communication between the first apparatus and the second apparatus, wherein the second minimum gap duration is based on the relative distance between the first apparatus and the second apparatus being within a second distance range during the second time period.

20 Claims, 10 Drawing Sheets

(56) References Cited

U.S. PATENT DOCUMENTS

| | | | | |
|---|---|---|---|---|
| 2024/0267772 | A1* | 8/2024 | Wigard | H04W 24/10 |
| 2025/0247728 | A1* | 7/2025 | Cui | H04B 7/18513 |
| 2025/0330928 | A1* | 10/2025 | Cui | H04W 56/0015 |

OTHER PUBLICATIONS

3GPP TS 38.211: "3rd Generation Partnership Project, Technical Specification Group Radio Access Network, NR, Physical Channels and Modulation (Release 18)", 3GPP TS 38.211, V18.1.0, Dec. 2023, pp. 1-159.

3GPP TS 38.213: "3rd Generation Partnership Project, Technical Specification Group Radio Access Network, NR, Physical Layer Procedures for Control (Release 18)", 3GPP TS 38.213, V18.1.0, Dec. 2023, pp. 1-300.

3GPP TS 38.300: "3rd Generation Partnership Project, Technical Specification Group Radio Access Network, NR, NR and NG-RAN Overall Description, Stage 2 (Release 18)", 3GPP TS 38.300, V18.0.0, Dec. 2023, pp. 1-265.

3GPP TS 38.331: "3rd Generation Partnership Project, Technical Specification Group Radio Access Network, NR, Radio Resource Control (RRC) Protocol Specification (Release 18)", V18.0.0, Dec. 2023, pp. 1-1606.

* cited by examiner

800

A method for wireless communications by an apparatus

Communicate, during a first time period, with a second apparatus according to a first minimum gap duration between uplink and downlink communication resources configured for communication between the first apparatus and the second apparatus, wherein the first minimum gap duration is based on a relative distance between the first apparatus and the second apparatus being within a first distance range during the first time period

805

Communicate, during a second time period, with the second apparatus according to a second minimum gap duration between uplink and downlink communication resources configured for communication between the first apparatus and the second apparatus, wherein the second minimum gap duration is based on the relative distance between the first apparatus and the second apparatus being within a second distance range during the second time period

810

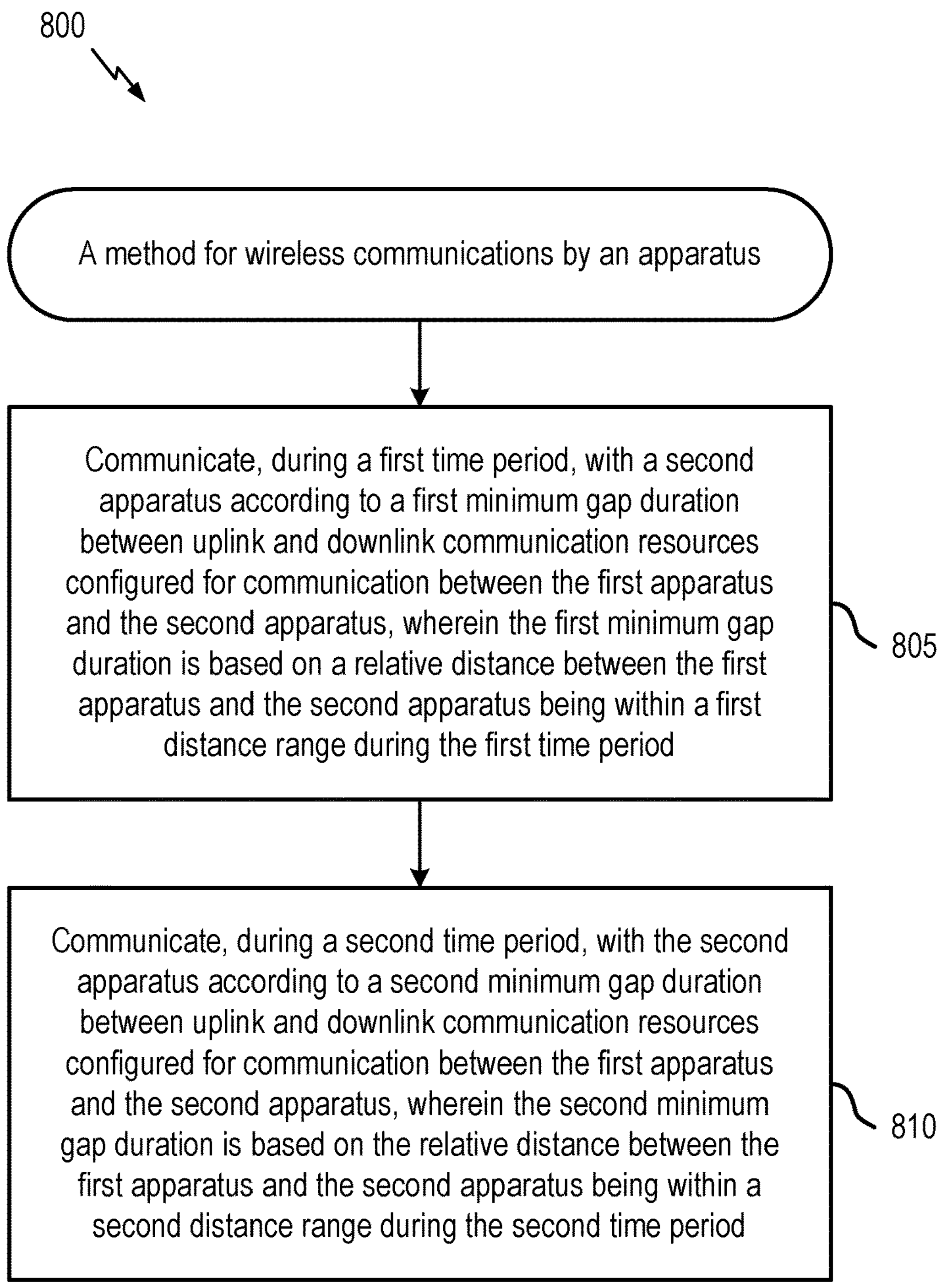

*FIG. 8*

FLEXIBLE GAP DURATION FOR NON-TERRESTRIAL NETWORK (NTN) COMMUNICATIONS

INTRODUCTION

Field of the Disclosure

Aspects of the present disclosure relate to wireless communications, and more particularly, to techniques for non-terrestrial network (NTN) communications.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by a first apparatus. The method includes communicating, during a first time period, with a second apparatus according to a first minimum gap duration between uplink and downlink communication resources configured for communication between the first apparatus and the second apparatus, wherein the first minimum gap duration is based on a relative distance between the first apparatus and the second apparatus being within a first distance range during the first time period; and communicating, during a second time period, with the second apparatus according to a second minimum gap duration between uplink and downlink communication resources configured for communication between the first apparatus and the second apparatus, wherein the second minimum gap duration is based on the relative distance between the first apparatus and the second apparatus being within a second distance range during the second time period.

Other aspects provide: one or more apparatuses operable, configured, or otherwise adapted to perform any portion of any method described herein (e.g., such that performance may be by only one apparatus or in a distributed fashion across multiple apparatuses); one or more non-transitory, computer-readable media comprising instructions that, when executed by one or more processors of one or more apparatuses, cause the one or more apparatuses to perform any portion of any method described herein (e.g., such that instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses); one or more computer program products embodied on one or more computer-readable storage media comprising code for performing any portion of any method described herein (e.g., such that code may be stored in only one computer-readable medium or across computer-readable media in a distributed fashion); and/or one or more apparatuses comprising one or more means for performing any portion of any method described herein (e.g., such that performance would be by only one apparatus or by multiple apparatuses in a distributed fashion). By way of example, an apparatus may comprise a processing system, a device with a processing system, or processing systems cooperating over one or more networks. An apparatus may comprise one or more memories; and one or more processors configured to cause the apparatus to perform any portion of any method described herein. In some examples, one or more of the processors may be preconfigured to perform various functions or operations described herein without requiring configuration by software.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 8 depicts a method for wireless communications.

DETAILED DESCRIPTION

Figure 1:
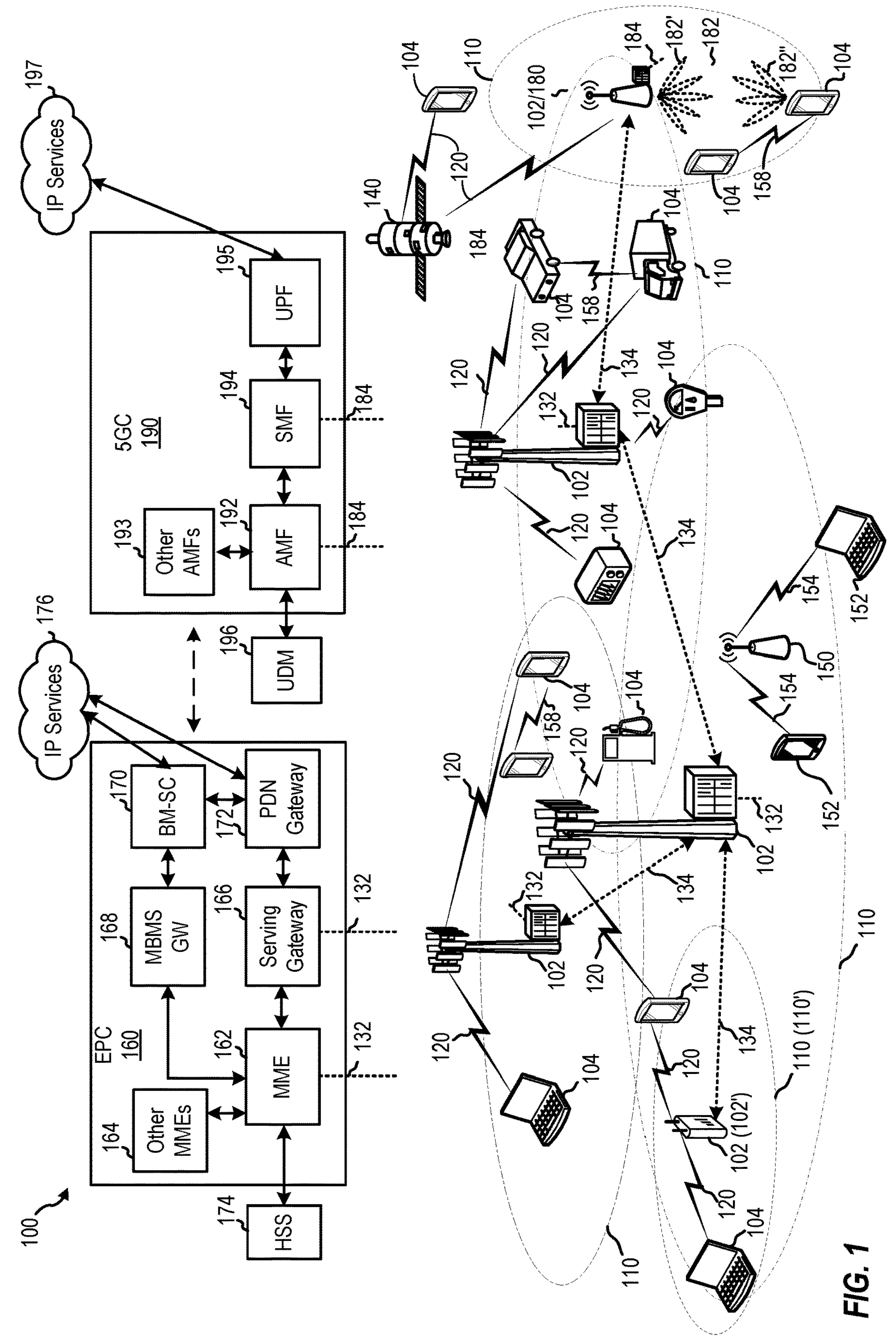
FIG. 1 depicts an example wireless communications network.

Aspects of the present disclosure provide apparatuses, methods, processing systems, and computer-readable mediums for communicating in a non-terrestrial network (NTN) using a gap duration based on distance between wireless communications devices.

In certain aspects, a user equipment (UE) is configured to communicate in an NTN, such as via an NTN payload and an NTN gateway that are part of the NTN. The NTN payload and the UE may each be an example of a wireless communications device or apparatus. An NTN gateway may refer to a ground base station providing connectivity to an NTN payload using a feeder link. An NTN payload may refer to a spaceborne (e.g., satellite) or airborne (e.g., airship, balloon, etc.) platform that provides connectivity to UEs via service link. For example, downlink packets sent from a core network to a UE may be sent from the core network to an NTN gateway, which sends the packets to an NTN payload, which sends the packets to the UE. Uplink packets sent from the UE to the core network may be sent from the UE to the NTN payload, which sends the packets to the NTN gateway, which sends the packets to the core network. The communications link/path between the NTN gateway and the NTN payload may be referred to as a feeder link, while the communications link/path between the NTN payload and the UE may be referred to as a service link.

Different types of NTN payloads may provide different areas of coverage for UEs. For example, a low earth orbit (LEO) satellite may provide coverage in a cell having a size of 100-1000 km, while a geostationary (GEO) satellite may provide coverage in a cell having a size of 200-3500 km. In either case, the NTN payload may provide coverage in a large area/cell.

Communication in an NTN may be subject to communications delay. One source of communication delay is the delay on the feeder link between the NTN payload and the NTN gateway. Another source of communications delay is the delay on the service link between the NTN payload and the UE. Each UE communicating (e.g., sending/receiving signals) with a particular NTN payload may experience the same common feeder link delay between the NTN payload and the NTN gateway. However, different UEs may experience different service link delay, as the actual distance between each UE and the NTN payload may be different, such as where different UEs are in different parts of the coverage area of the NTN payload. In particular, the time for signals to be communicated, such as propagated, between the UE and the NTN payload are based on the distance between the NTN payload and the UE, such that the greater the distance between the two, the greater the time for signals to be communicated between the two, thus increasing the service link delay.

Due to the large coverage area of an NTN payload, the variation between the service link delay for a UE that is nearer the center of the coverage area (e.g., closer to the NTN payload), and the service link delay for a UE farther from the center of the coverage area (e.g., farther from the NTN payload, such as near the edge of the coverage area), may be large. Terrestrial networks do not typically have such variation in delay between UE and network entity communications due to the smaller coverage area/cell size of terrestrial networks.

A technical problem with communications delay in an NTN is that a gap duration between uplink and downlink communications may be needed, especially when using time division duplexing (TDD), between uplink and downlink communications. In TDD, uplink and downlink communication between the UE and the core network (e.g., via an NTN payload and an NTN gateway) may occur on the same frequency, such that the UE may not be capable of both sending signals on the uplink and receiving signals on the downlink at the same time as the signals may interfere with one another, or the UE may not have hardware suitable for transmitting and receiving signals on the same frequency at the same time. Further, due to communications delay in an NTN, there may be a time delay between when a UE sends an uplink communication to the core network and the core network receives the uplink communication, and also a time delay between when the core network sends a downlink communication to the UE and the UE receives the downlink communication. To account for such communications delay, as described further herein, a gap duration may be scheduled between communications resources (e.g., time-frequency resources) scheduled for uplink communications and communication resources scheduled for downlink communications.

A technical problem regarding the gap duration is that due to the variation in service link delay for a UE based on variable distance between the UE and the NTN payload, UEs may be capable of communicating according to different minimum gap durations at different times. As is discussed further herein, a UE with a smaller service link delay, as in a UE closer to the NTN payload, may be capable of communicating using a smaller minimum gap duration, while a UE with a larger service link delay, as in a UE farther from the NTN payload, may only be capable of communicating using a larger minimum gap duration. While a larger gap duration that accommodates UEs farther from the NTN payload may be selected for all UEs communicating with the NTN payload, such a gap duration may cause large inefficiencies in communication, as many communication resources may occur during the gap duration that cannot be used for communication by the UEs.

Certain aspects herein may provide a technical solution to the problem of inefficient communication in the NTN due to communications delays. In particular, certain aspects herein provide techniques for configuring a minimum gap duration between uplink and downlink communication between an NTN payload and a given UE, based on a relative distance between the NTN payload the given UE, which may be based on where in the coverage area of the NTN payload the UE is located. Different UEs may be configured to communicate according to different minimum gap durations. In certain aspects, different ranges of distances between a UE and NTN payload may be associated with different minimum gap durations. Accordingly, UEs within a given distance range may be associated with the same minimum gap duration. Configuring UEs to communicate according to a gap duration based on distance may improve communication efficiency in an NTN, such as by allowing a UE to utilize more communication resources for communication with the NTN payload by using a shorter gap duration when it is closer to an NTN payload, while still accommodating the UE when it is farther from the NTN payload and may need a longer gap duration.

Introduction to Wireless Communications Networks

The techniques and methods described herein may be used for various wireless communications networks. While aspects may be described herein using terminology commonly associated with 3G, 4G, 5G, 6G, and/or other generations of wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). As such communications devices are part of wireless communications network 100, and facilitate wireless communications, such communications devices may be referred to as wireless communications devices. For example, various functions of a network as well as various devices associated with and interacting with a network may be considered network entities. Further, wireless communications network 100 includes terrestrial aspects, such as ground-based network entities (e.g., BSs 102), and non-terrestrial aspects (also referred to herein as non-terrestrial network entities), such as satellite 140 and/or aerial or spaceborne platform(s), which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, data centers, or other similar devices. UEs 104 may also be referred to more generally as a mobile device, a wireless device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (CNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Generally, a cell may refer to a portion, partition, or segment of wireless communication coverage served by a network entity within a wireless communication network. A cell may have geographic characteristics, such as a geographic coverage area, as well as radio frequency characteristics, such as time and/or frequency resources dedicated to the cell. For example, a specific geographic coverage area may be covered by multiple cells employing different frequency resources (e.g., bandwidth parts) and/or different time resources. As another example, a specific geographic coverage area may be covered by a single cell. In some contexts (e.g., a carrier aggregation scenario and/or multi-connectivity scenario), the terms "cell" or "serving cell" may refer to or correspond to a specific carrier frequency (e.g., a component carrier) used for wireless communications, and a "cell group" may refer to or correspond to multiple carriers used for wireless communications. As examples, in a carrier aggregation scenario, a UE may communicate on multiple component carriers corresponding to multiple (serving) cells in the same cell group, and in a multi-connectivity (e.g., dual connectivity) scenario, a UE may communicate on multiple component carriers corresponding to multiple cell groups.

Figure 2:
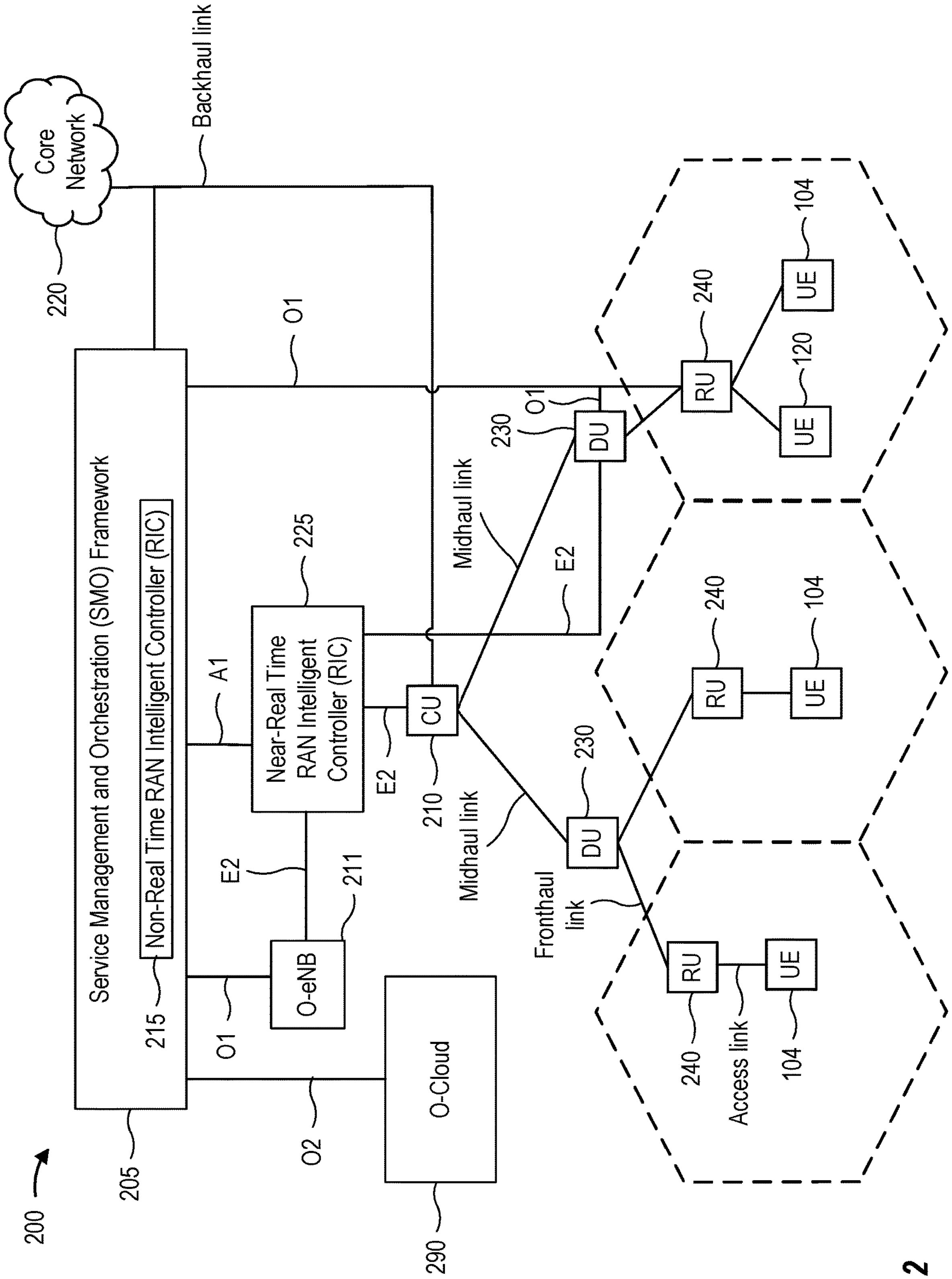
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHZ-7125 MHz, which is often referred to (interchangeably) as "Sub-6 GHz". Similarly, 3GPP currently defines Frequency Range 2 (FR2) as including 24,250 MHZ-71,000 MHZ, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52, 600 MHz and a second sub-range FR2-2 including 52,600 MHz-71,000 MHz. A base station configured to communicate using mm Wave/near mm Wave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more DUs 230 and/or one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-CNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
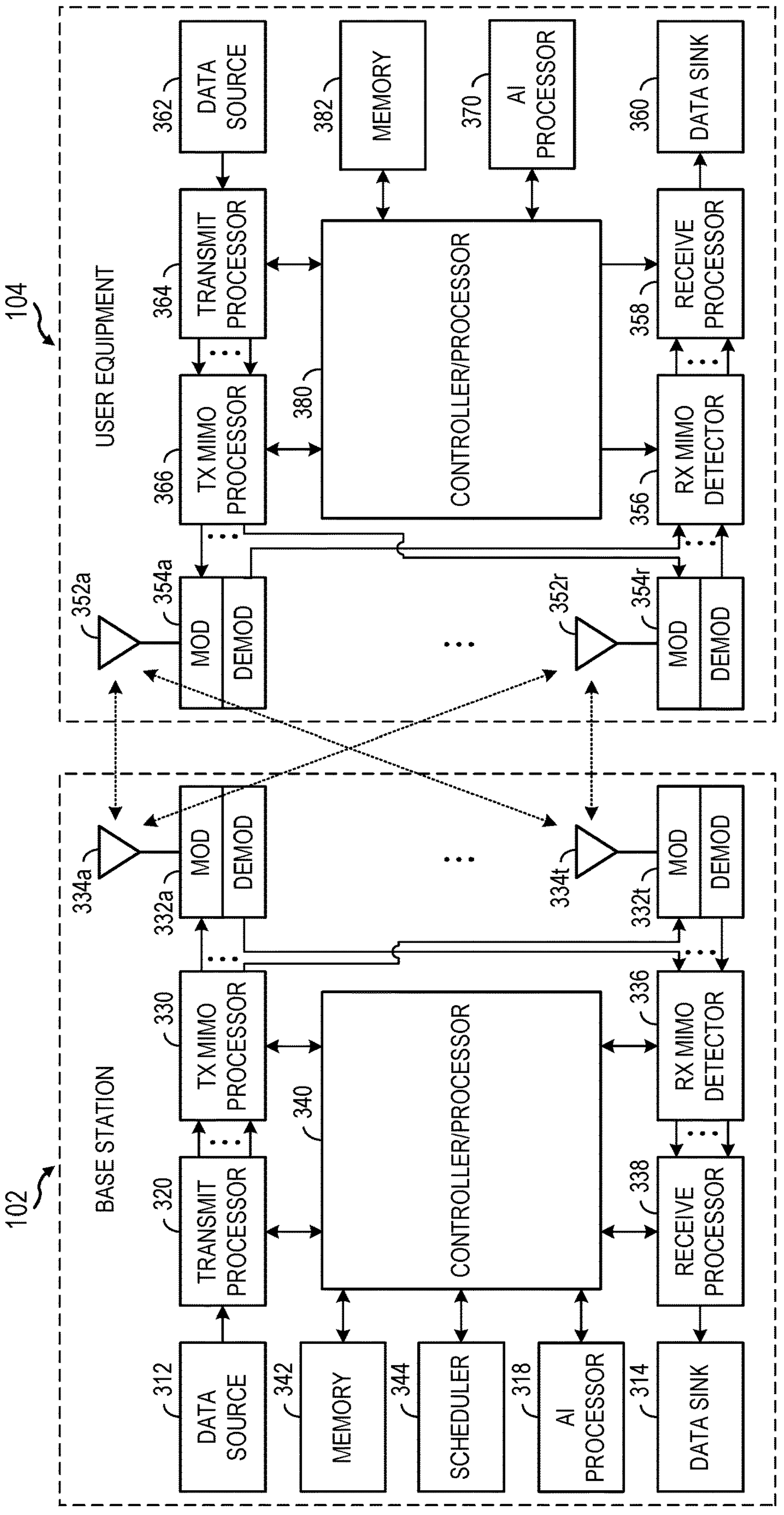
FIG. 3 depicts aspects of an example base station and an example user equipment (UE).

FIG. 3 depicts aspects of an example BS 102 and a UE 104.

Generally, BS 102 includes various processors (e.g., 318, 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 314). For example, BS 102 may send and receive data between BS 102 and UE 104. BS 102 includes controller/processor 340, which may be configured to implement various functions described herein related to wireless communications. Note that the BS 102 may have a disaggregated architecture as described herein with respect to FIG. 2.

Generally, UE 104 includes various processors (e.g., 358, 364, 366, 370, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

RX MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a RX MIMO detector 336 if applicable, and further processed by a receive processor 338 to obtain decoded data and control information sent by UE 104. Receive processor 338 may provide the decoded data to a data sink 314 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

In various aspects, artificial intelligence (AI) processors 318 and 370 may perform AI processing for BS 102 and/or UE 104, respectively. The AI processor 318 may include AI accelerator hardware or circuitry such as one or more neural processing units (NPUs), one or more neural network processors, one or more tensor processors, one or more deep learning processors, etc. The AI processor 370 may likewise include AI accelerator hardware or circuitry. As an example, the AI processor 370 may perform AI-based beam management, AI-based channel state feedback (CSF), AI-based antenna tuning, and/or AI-based positioning (e.g., non-line of sight positioning prediction). In some cases, the AI processor 318 may process feedback from the UE 104 (e.g., CSF) using hardware accelerated AI inferences and/or AI training. The AI processor 318 may decode compressed CSF from the UE 104, for example, using a hardware accelerated AI inference associated with the CSF. In certain cases, the AI processor 318 may perform certain RAN-based functions including, for example, network planning, network performance management, energy-efficient network operations, etc.

FIGS. 4A, 4B, 4C, and 4D depict aspects of data structures for a wireless communications network, such as wireless communications network 100 of FIG. 1.

Figure 4A:
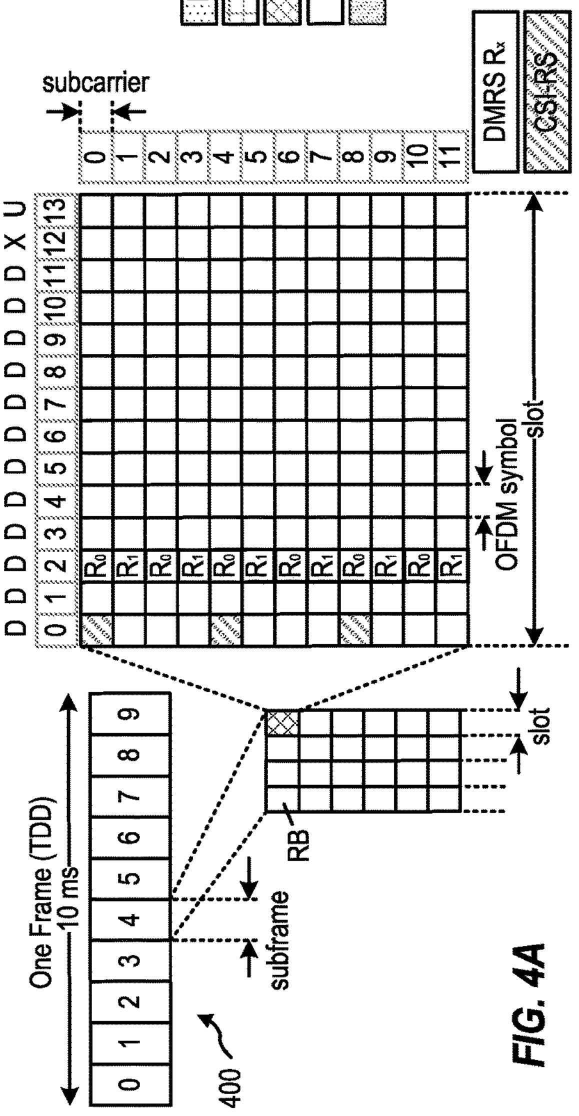
FIGS. 4A, 4B, 4C, and 4D depict various example aspects of data structures for a wireless communications network.
Figure 4B:
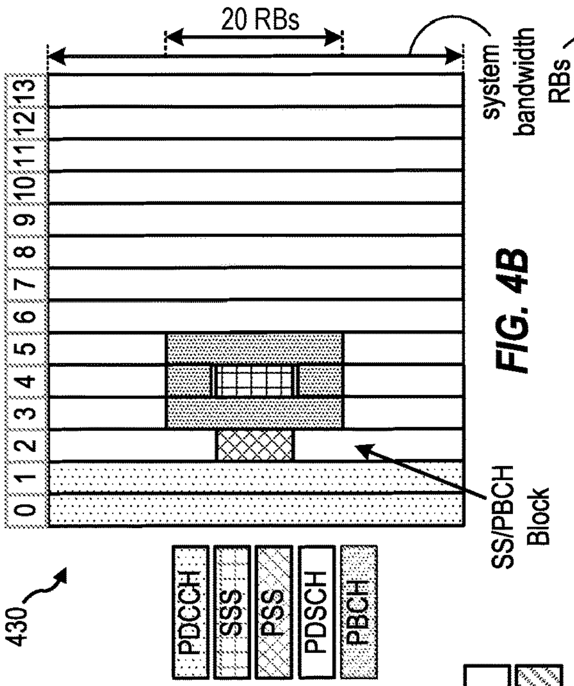
Figure 4C:
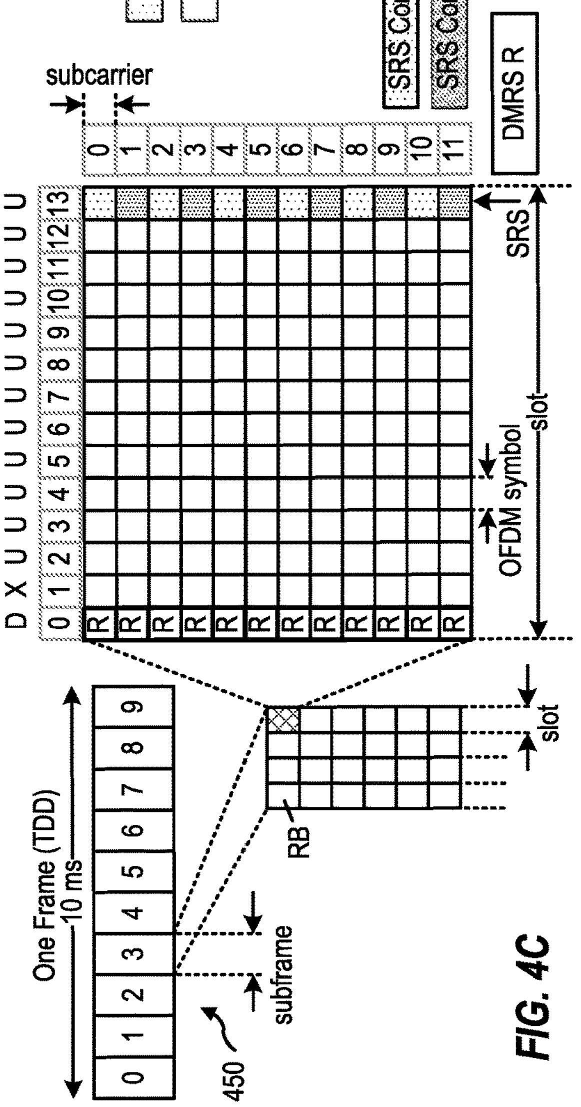
Figure 4D:
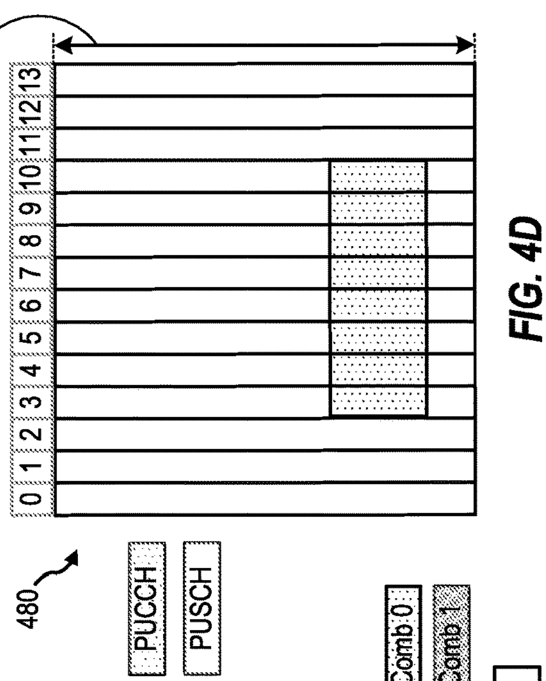

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where Dis DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 12 or 14 symbols, depending on the cyclic prefix (CP) type (e.g., 12 symbols per slot for an extended CP or 14 symbols per slot for a normal CP). Subframes may also include mini-slots, which generally have fewer symbols than an entire slot. Other wireless communications technologies may have a different frame structure and/or different channels.

In certain aspects, the number of slots within a subframe (e.g., a slot duration in a subframe) is based on a numerology, which may define a frequency domain subcarrier spacing and symbol duration as further described herein. In certain aspects, given a numerology μ, there are $2^{\mu}$ slots per subframe. Thus, numerologies (μ) 0 to 6 may allow for 1, 2, 4, 8, 16, 32, and 64 slots, respectively, per subframe. In some cases, the extended CP (e.g., 12 symbols per slot) may be used with a specific numerology, e.g., numerology 2 allowing for 4 slots per subframe. The subcarrier spacing and symbol length/duration are a function of the numerology. The subcarrier spacing may be equal to $2^{\mu}\times15$ kHz, where μ is the numerology 0 to 6. As an example, the numerology μ=0 corresponds to a subcarrier spacing of 15 kHz, and the numerology μ=6 corresponds to a subcarrier spacing of 960 kHz. The symbol length/duration is inversely related to the subcarrier spacing. FIGS. 4A, 4B, 4C, and 4D provide an example of a slot format having 14 symbols per slot (e.g., a normal CP) and a numerology μ=2 with 4 slots per subframe. In such a case, the slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme including, for example, quadrature phase shift keying (QPSK) or quadrature amplitude modulation (QAM).

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block (SSB), and in some cases, referred to as a synchronization signal block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example Non-Terrestrial Network Communications

Figure 5:
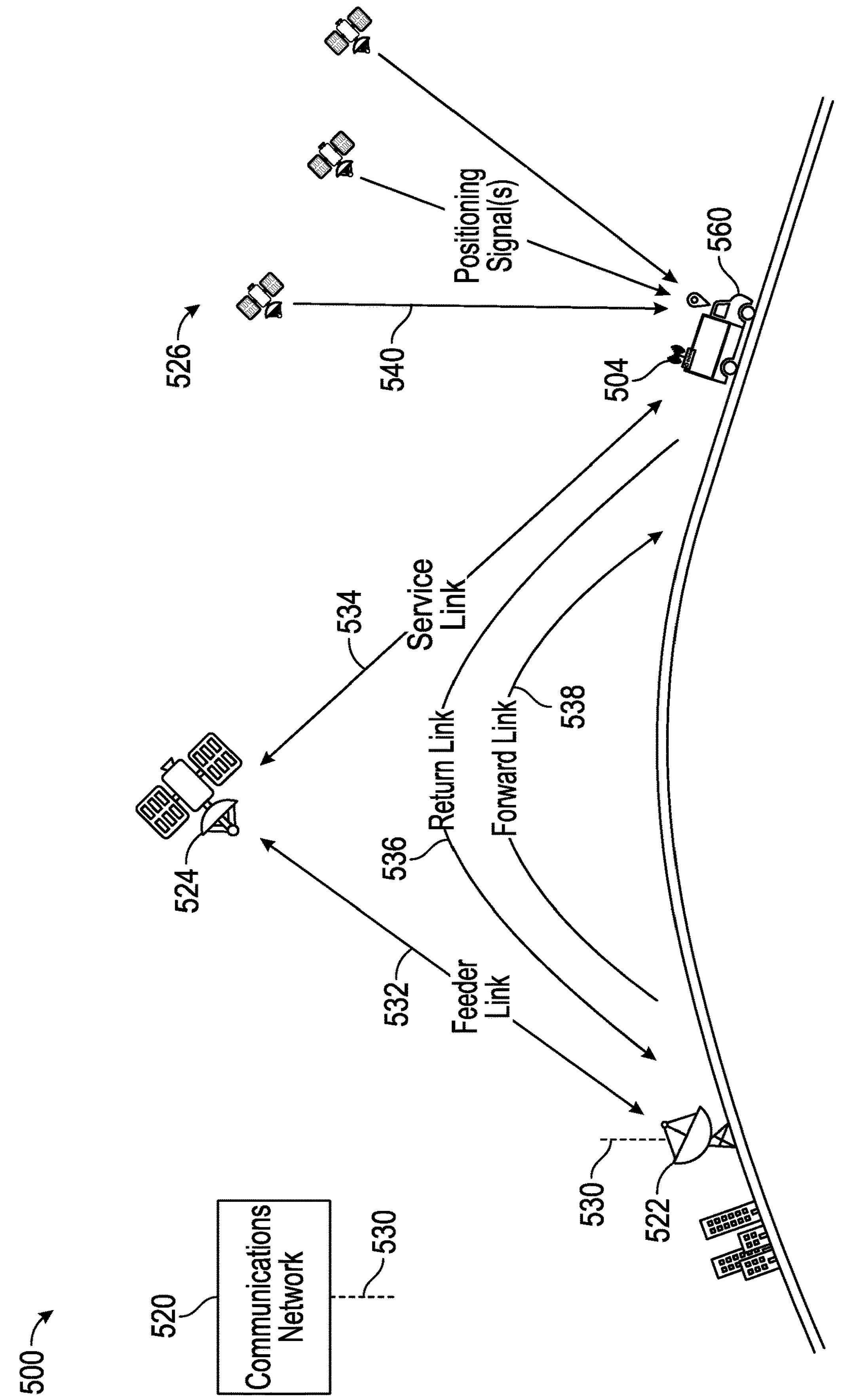
FIG. 5 depicts an example non-terrestrial network (NTN).

FIG. 5 depicts an example NTN 500. Certain wireless communication systems (e.g., Evolved Universal Terrestrial Radio Access (E-UTRA) systems, 5G New Radio (NR) systems, and/or future wireless communication systems) may facilitate communications coverage via an NTN, such as a spaceborne (e.g., satellite) or airborne (e.g., airship, balloon, etc.) platform that provides wireless connectivity to certain devices, such as UEs. In some cases, NTN communications may further facilitate communications with Narrowband Internet of Things (NB-IoT) devices, such as a sensor and/or identification tag attached to a vehicle (e.g., a delivery truck).

In this example, the NTN 500 includes a communications network 520 (e.g., the EPC 160 and/or the 5GC network 190 of FIG. 1), an NTN gateway 522, and an NTN payload 524. The NTN 500 may facilitate wireless communications with one or more UEs 504 (e.g., the UE 104 of FIG. 1). The UE 504 may include any of various types of UEs, such as an NB-IoT UE. As an example, the UE 504 may include an IoT sensor and/or identification tag affixed to a vehicle 560. The NTN 500 may allow the UE 504 to be in a coverage area for wireless communications even where the vehicle 560 travels great distances, for example, across one or more countries, or is stationed in certain locations lacking a terrestrial communications network. Note that the NB-IoT UE is an example, and other UEs may be capable of NTN communications.

The NTN gateway 522 may communicate with the communications network 520 via one or more interfaces 530, such as backhaul links including NG interface(s) and/or S1 interface(s) between a RAN and a core network. The interface(s) 530 may include wired and/or wireless connections. The NTN gateway 522 may serve one or more NTN payloads 524 (e.g., network entities or NTN entities).

The NTN payload 524 may be or include one or more airborne platforms (e.g., a drone or balloon) and/or one or more spaceborne platforms (e.g., the satellite 140 as depicted in FIG. 1). The NTN payload 524 may be served by one or more NTN gateways 522. In certain aspects, the NTN payload 524 may include any of various non-terrestrial network entities and/or platforms that provide radio access through Geosynchronous orbits (GSO) (e.g., which includes GEO), Non-Geosynchronous Orbit (NGSO), which includes Low-Earth Orbit (LEO) and Medium Earth Orbit (MEO), or High Altitude Platform Systems (HAPS).

The NTN payload 524 may transparently forward communications (e.g., the radio protocol) received from the UE 504 (via a service link 534) to the NTN gateway 522 (via a feeder link 532), and/or vice-versa. The NTN gateway 522 and the NTN payload 524 may communicate via a wireless communication link referred to as the feeder link 532, and the NTN payload 524 may communicate with the UE 504 via a wireless communication link referred to as the service link 534. In some cases, the transparent links between the NTN gateway 522 and the UE 504 may be referred to as a return link 536 for communications from the UE 504 to the NTN gateway 522 and as a forward link 538 for communications from the NTN gateway 522 to the UE 504. In certain aspects, for communications from the NTN gateway 522, the NTN payload 524 may change the carrier frequency used on the feeder link 532, before re-transmitting the communications on the service link 534, and/or vice versa (respectively on the feeder link).

The service link 534 may include an Earth-fixed service link, a quasi-Earth-fixed service link, and/or an Earth-moving service link. An Earth-fixed service link may be implemented by beam(s) continuously covering the same geographical area(s) all the time (e.g., the case of GSO satellites). A quasi-Earth-fixed service link may be provisioned by beam(s) covering one geographic area for a limited period and a different geographic area during another period (e.g., the case of NGSO satellites generating steerable beams). An Earth-moving service link may be provisioned by beam(s) with a coverage area that slides over the Earth surface (e.g., the case of NGSO satellites generating fixed or non-steerable beams).

In certain aspects, the UE 504 may be in communication with a global navigation satellite system (GNSS) 526. For example, the UE 504 may receive positioning signal(s) 540 from the GNSS 526, and the positioning signal(s) 540 may provide certain information for synchronizing (e.g., time and/or frequency synchronization) the service link 534. The UE 504 may obtain the location of the NTN payload 524 via system information from the NTN payload 524, based on publically available ephemeris data for the NTN payload 524 (e.g., from one or more servers), or the like. The UE 504 may estimate a distance between the NTN payload 524 and UE 504, and/or communications delay (timing delay) and Doppler effects associated with the service link 534, using the positioning signal(s) 540 and the location of the NTN payload 524, or using other techniques. Similarly, the NTN payload 524 or other network entity may make such estimations, such as by receiving location information of the UE 504 from the UE 504, or using other techniques.

Example Gap Durations

Figure 6:
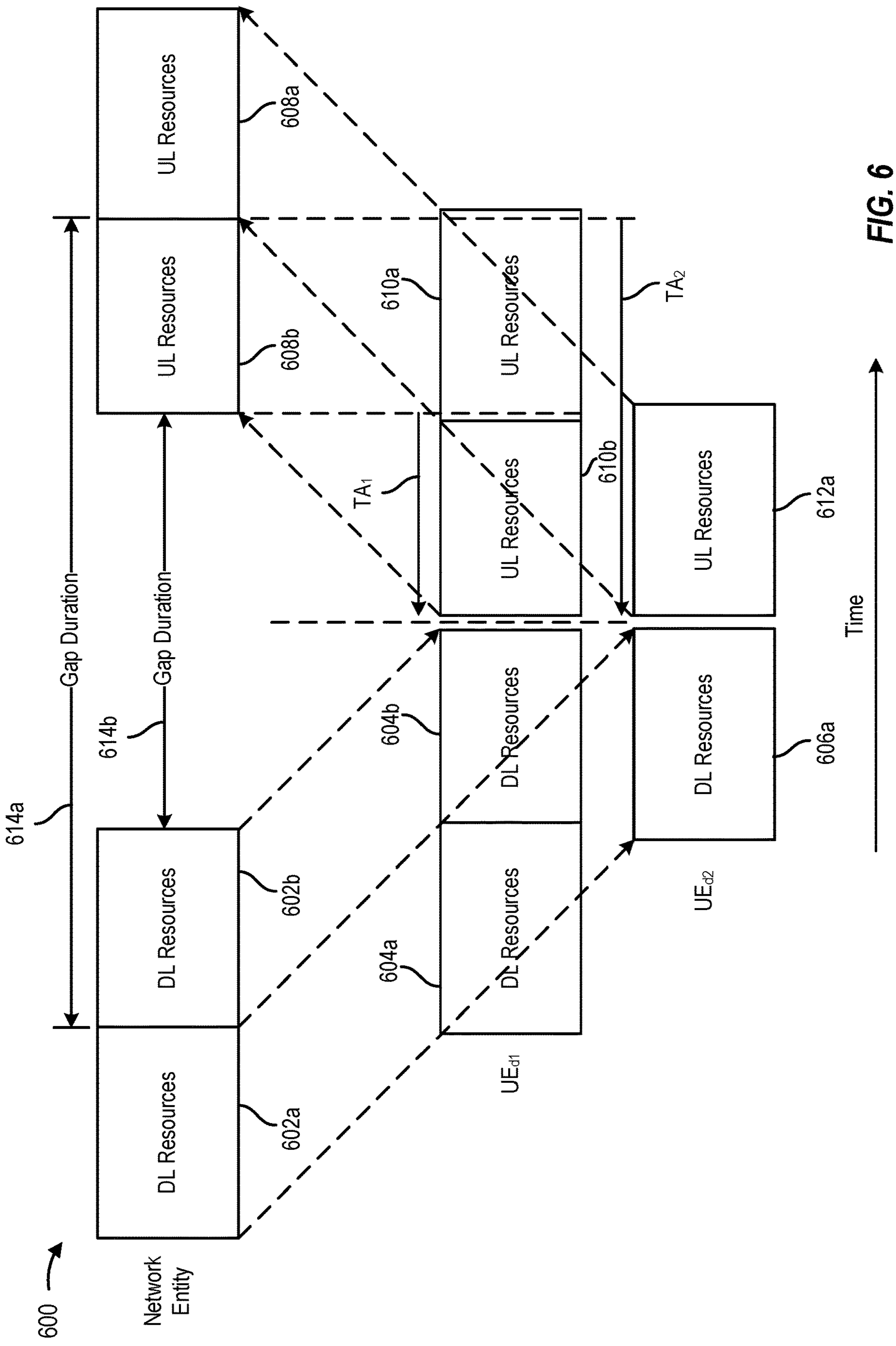
FIG. 6 depicts example gap durations between a network entity and a UE based on a distance between the network entity and the UE.

FIG. 6 depicts example gap durations between a network entity (e.g., NTN payload, such as NTN payload 524) and a UE (e.g., UE 504) based on a distance between the network entity and the UE.

As an example, the network entity may communicate with a UE at a first distance ($UE_{d1}$) and a UE at a second distance ($UE_{d2}$), where the second distance is greater than the first distance. The network entity may send one or more signals on DL resources 602*a* (e.g., time-frequency resources). As shown, the one or more signals may reach $UE_{d1}$ and $UE_{d2}$ at different times, based on different propagation delays of the one or more signals corresponding to the different distances between the network entity and each of $UE_{d1}$ and $UE_{d2}$. In particular, the one or more signals are received at $UE_{d1}$ in DL resources 604*a*, while the one or more signals are received at $UE_{d2}$ in DL resources 606*a*. DL resources 602*a*, 604*a*, and 606*a* may correspond to the same time-frequency resources (or similar time-frequency resources with some Doppler shift), where time-frequency resources are defined from the perspective of the network entity, but occur at different times at the network entity and UEs due to the propagation delays.

Similarly, each of $UE_{d1}$ and $UE_{d2}$ may send one or more signals to the network entity in UL resources 610*a* and 612*a*, respectively, such that both the one or more signals from $UE_{d1}$ and the one or more signals from $UE_{d2}$ reach the network entity at the same (e.g., approximately same) time in UL resources 608*a*. UL resources 608*a*, 610*a*, and 612*a* may correspond to the same time-frequency resources (or similar time-frequency resources with some Doppler shift), where time-frequency resources are defined from the perspective of the network entity, but occur at different times at the network entity and UEs due to the propagation delays. In particular, each of $UE_{d1}$ and $UE_{d2}$ may be configured to communicate with the network entity using a corresponding timing advance (TA), such that uplink communications from multiple UEs are time synchronized to arrive at the network entity at the same time. A timing advance may refer to a time offset for start time of transmission of the uplink communication by the UE, as compared to the start time at the network entity of scheduled uplink resources for communicating the uplink communication. For example, $UE_{d2}$ is configured to communicate with a $TA_2$, while the $UE_{d1}$ is configured to communicate with a $TA_1$. $TA_2$ is greater than $TA_1$ based on $UE_{d2}$ being farther from, and having a greater propagation delay with, the network entity as compared to $UE_{d1}$.

As shown, there is a gap duration 614*a* between the end time of DL resources 602*a* and the start time of UL resources 608*a*. Such gap duration 614*a*, as shown, assures that DL resources 606*a* and UL resources 612*a* used by $UE_{d2}$ for communications do not overlap in time. If the gap duration 614*a* was shorter, the DL resources and UL resources used by $UE_{d2}$ for communications would overlap, leading to communications issues. Here, $UE_{d2}$ can (e.g., immediately) transmit uplink communications on UL resources 612*a* after finishing receiving downlink communications on DL resources 606*a*.

The gap duration 614*a* further assures that DL resources 604*a* and UL resources 610*a* used by $UE_{d1}$ for communications do not overlap in time. However, as shown, $UE_{d1}$ is capable of communicating on additional DL resources and UL resources without the DL resources and the UL resources overlapping in time. For example, $UE_{d1}$ is capable of communicating on additional DL resources 604*b* and UL resources 610*b*, without the DL resources and the UL resources overlapping in time. Accounting for propagation delays, such DL resources 604*b* and UL resources 610*b* at $UE_{d1}$ correspond to DL resources 602*b* and UL resources 608*b*, respectively, at the network entity. For example, the network entity may send one or more signals to $UE_{d1}$ on DL resources 602*b*, which $UE_{d1}$ may receive on DL resources 604*b*. DL resources 602*b* and 604*b* may correspond to the same time-frequency resources (or similar time-frequency resources with some Doppler shift), where time-frequency resources are defined from the perspective of the network entity, but occur at different times at the network entity and UEs due to the propagation delays. Further, the $UE_{d1}$ may send one or more signals to the network entity on UL resources 610*b*, which the network entity may receive on UL resources 608*b*. UL resources 608*b* and 610*b* may correspond to the same time-frequency resources (or similar time-frequency resources with some Doppler shift), where time-frequency resources are defined from the perspective of the network entity, but occur at different times at the network entity and UEs due to the propagation delays.

Accordingly, gap duration 614*b* between the end time of DL resources 602*b* and the start time of UL resources 608*b*, which is shorter than gap duration 614*b*, assures that DL resources and UL resources used by $UE_{d1}$ for communications do not overlap in time. Further, by using gap duration 614*b*, as compared to gap duration 614*a*, for communications between the network entity and $UE_{d1}$, the number of communications resources used for communications between the network entity and $UE_{d1}$ can be increased, leading to better throughput and efficient usage of communication resources. In particular, since $UE_{d1}$ and $UE_{d2}$ are different distances from the network entity, and thus have different propagation delays for communication with network entity, the minimum gap duration between scheduled uplink and downlink resources is different to ensure the UL and DL resources do not collide. Accordingly, certain techniques discussed herein relate to communicating in an NTN with a gap duration based on a distance of the UE from the NTN payload.

Example Gap Duration Configuration

As discussed, certain aspects herein provide techniques for configuring a minimum gap duration between uplink and downlink communication between an NTN payload and a given UE, based on a relative distance between the NTN payload and the given UE, which may be based on where in the coverage area of the NTN payload the UE is located.

Figure 7:
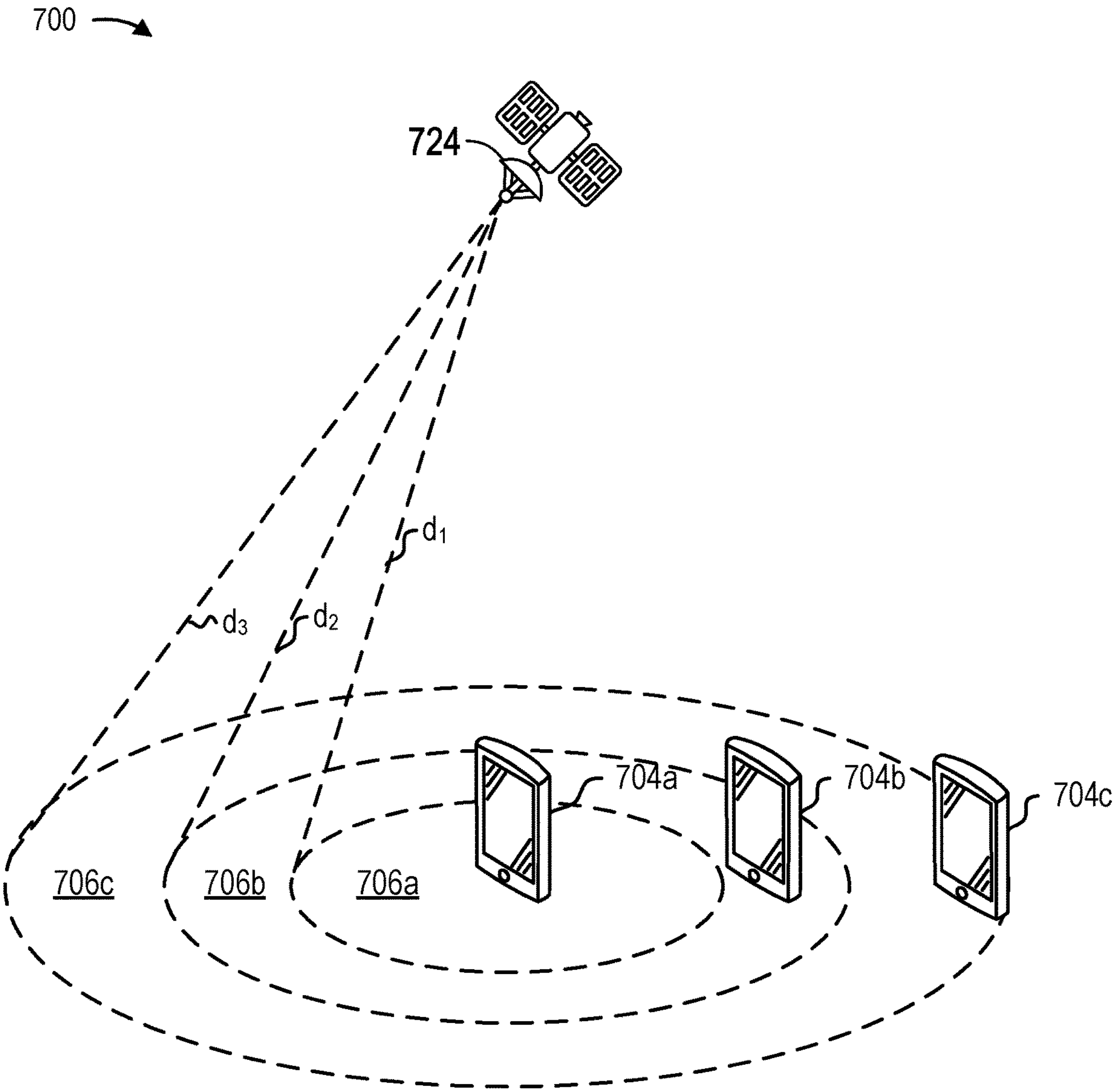
FIG. 7 depicts example distance ranges of a coverage area of a NTN payload.

In certain aspects, the coverage area of an NTN payload may be divided into a plurality of distance ranges. FIG. 7 depicts example distance ranges 706*a-c* of a coverage area of a NTN payload 724. Though distance ranges 706*a-c* are shown as concentric circles or "rings" for ease of illustration, it should be noted that in actual practice the distance ranges may have a different shape. Further, there may be additional or fewer distance ranges. As shown, distance range 706*a* corresponds to a distance from NTN payload 724 of less than (or equal to) $d_1$. Distance range 706*b* corresponds to a distance from NTN payload 724 of greater than $d_1$ and less than (or equal to) $d_2$. Distance range 706*c* corresponds to a distance from NTN payload 724 of greater than $d_2$ and less than (or equal to) $d_3$.

In certain aspects, each distance range 706*a-c* may be associated with a gap duration between uplink and downlink communications. The gap duration of a given distance range may be based on the highest distance value in the distance range, to accommodate all UEs in the distance range. For example, distance range 706*a* may be associated with a (e.g., minimum) gap duration based on $d_1$, distance range 706*b* may be associated with a (e.g., minimum) gap duration based on $d_2$, and distance range 706*c* may be associated with a (e.g., minimum) gap duration based on $d_3$.

Accordingly, as shown, UE 704*a*, in distance range 706*a*, may be configured with a minimum gap duration between uplink and downlink resources scheduled for communication between UE 704*a* and NTN payload 724, where the minimum gap duration is based on distance $d_1$ such that the uplink and downlink resources do not overlap/collide as discussed. Further, UE 704*b*, in distance range 706*b*, may be configured with a minimum gap duration between uplink and downlink resources scheduled for communication between UE 704*b* and NTN payload 724, where the minimum gap duration is based on distance $d_2$ such that the uplink and downlink resources do not overlap/collide as discussed. UE 704*c*, in distance range 706*c*, may be configured with a minimum gap duration between uplink and downlink resources scheduled for communication between UE 704*c* and NTN payload 724, where the minimum gap duration is based on distance $d_3$ such that the uplink and downlink resources do not overlap/collide as discussed.

The coverage area of NTN payload 724 may be divided into any number of distance ranges, and each distance range may include any range of distances. In certain aspects, the coverage area is divided into distance ranges each covering the same area. In certain aspects, the coverage area is divided into distance ranges each spanning the same distance (e.g., $d_1=d_2-d_1=d_3-d_2$).

In certain aspects, each distance range, or "ring" k of N rings, covers an area equal to (2k−1)/N^2, where the distance range closest to the NTN payload 724 is k=1, and k increases outward (e.g., for distance range 706*a*: k=1, for distance range 706*b*: k=2, and for distance range 706*c*: k=3, where N=3). In certain such aspects, each distance range is configured/associated with a linearly reduced gap duration equal to k/N. In certain such aspects, the reduced gap duration across distance ranges is:

$$\frac{1}{N^3}\sum_{k=1}^{N}(2k-1)k$$

In certain aspects, to configure UEs with a minimum gap duration based on a distance range in which the UE is located, a UE is configured with a frame format associated with the distance range, such that different distance ranges are associated with different frame formats. For example, with reference to FIG. 6, $UE_{d1}$ may be configured with a frame format where DL resources and UL resources are allocated to $UE_{d1}$ with the minimum gap duration 614*b*, while $UE_{d2}$ may be configured with a frame format where DL resources and UL resources are allocated to $UE_{d2}$ with the minimum gap duration 614*a*. In certain aspects, a network entity may send (e.g., via RRC signaling) to the UE, a configuration for each of a plurality of distance ranges, associating each of the plurality of distance ranges with a respective frame format corresponding to a respective gap duration. Further, to configure the UE when the UE is within a particular distance range, the network entity may send (e.g., using medium access control (MAC)) signaling, an identifier (e.g., index) of one of the plurality of distance ranges configured at the UE, such that the UE is configured with the respective frame format associated with the identified distance range. UE knowledge of the frame format to utilize may provide power savings at the UE, such as avoiding performing PDCCH blind detection on resources the UE cannot use for communication, avoiding measuring reference signals (e.g., channel state information (CSI) reference signals (CSI-RSs) on resources the UE cannot use for communication (e.g., avoiding false measurements, reducing power consumption, etc.). Further, a UE with information indicating certain resources are not shared for use by an adjacent distance range may measure such resources with lower interference.

In certain aspects, to configure UEs with a minimum gap duration based on a distance range in which the UE is located, each UE is configured with the same frame format associated with the smallest minimum gap duration among the UEs. For UEs that require a larger gap duration, a network entity, e.g., NTN payload, may not schedule communications, such as provide uplink or downlink grants, for UL and DL resources in the smallest minimum gap duration that do not abide by the larger gap duration. In certain aspects, for a UE that requires a larger gap duration, the network entity may configure the UE with a larger downlink-uplink switch time (e.g., non-zero switch time). In certain aspects, for a UE that requires a larger gap duration, the network entity may reduce a PDSCH/PUSCH allocation (e.g., Start and Length Indicator Value (SLIV) of the UE. For example, with reference to FIG. 6, $UE_{d1}$ and $UE_{d2}$ may be configured with the same frame format where UL and DL resources are separated by gap duration 614*b*. NTN payload may send to $UE_{d1}$ signaling (e.g., UL and/or DL grants) scheduling communications in any of DL resources 602*a*, 602*b* and UL resources 608*a*, 608*b*, such that $UE_{d1}$ is configured with gap duration 614*b*. However, NTN payload may send to $UE_{d2}$ signaling (e.g., UL and/or DL grants) scheduling communications in only any of DL resources 602*a* and UL resources 608*a* such that $UE_{d2}$ is configured with gap duration 614*a*, despite being configured with a frame format associated with gap duration 614*b*.

Certain aspects herein relate to techniques for identifying a distance range associated with a UE and/or configuring a gap duration for a UE based on the distance range associated with the UE.

In certain aspects, to facilitate identification of a distance range in which the UE is located, such as by a network entity, the UE is configured to send position information of the UE to the network entity, such as by sending signaling including an indication of a position of the UE to the NTN payload. In certain aspects, the indication of the position includes an indication of an absolute position of the UE, such as coordinates, such as based on GPS information. The NTN payload or other network entity, based on position of the NTN payload, may determine the distance between the NTN payload and the UE. In certain aspects, the indication of the position comprises a relative distance between the UE and the NTN payload. The UE, based on the UE position, and the NTN payload position (e.g., based on receiving such information from the NTN payload, or based on ephemeris data, as discussed), may determine the relative distance between the UE and the NTN payload.

In certain aspects, the UE may be configured to report the position information periodically. In certain aspects, the UE may be configured to report the position information when the position of the UE satisfies one or more thresholds associated with a current distance range the UE is within. For example, the one or more thresholds may include the bounds of the distance range, such as a first distance and a second distance. In certain aspects, the UE is configured to report the position information when the UE moves from one distance range to another, such as for at least a period of time. Reporting only when the UE satisfies a threshold or moves from one distance range to another, may help reduce overhead in reporting, as compared to periodic reporting. In certain aspects, a network entity (e.g., NTN payload) is configured to send, e.g., via the NTN payload, configuration of the one or more thresholds for reporting, such as for each of one or more distance ranges.

In certain aspects, to facilitate identification of a distance range in which the UE is located, such as by a network entity, the UE is configured to send TA information of the UE to the network entity, such as by sending signaling including an indication of a TA of the UE to the NTN payload. In certain aspects, a UE is configured to determine a TA to be used for uplink communications with the NTN payload, such as based on reception and measuring of downlink signals from the NTN payload and, in some cases, TA correction parameters received from the NTN payload. The network, such as the NTN payload, may not know what TA is used by the UE without such indication of the TA information, as the UE may itself determine the actual TA used. As discussed with respect to FIG. 6, the TA used for uplink communication between the UE and the NTN payload is based on the propagation delay, and therefore distance, between the UE and the NTN payload. Accordingly, the TA may be indicative of the distance and useful for determine a distance range in which the UE is located.

In certain aspects, the UE may be configured to report the TA information, such as the TA for uplink communication between the UE and the NTN payload, periodically. In certain aspects, the UE may be configured to report the TA information when the TA of the UE satisfies one or more thresholds associated with a current distance range the UE is within. For example, the one or more thresholds may include TAs associated with the bounds (e.g., upper and/or lower) of the distance range, such as a first TA and a second TA. The thresholds may be based on propagation delay boundaries of the distance range (e.g., based on a number of distance ranges of the coverage area of the NTN payload, an altitude of the NTN payload, etc.). Reporting only when the TA satisfies a threshold, may help reduce overhead in reporting, as compared to periodic reporting. In certain aspects, a network entity (e.g., NTN payload) is configured to send, e.g., via the NTN payload, configuration of the one or more thresholds for reporting, such as for each of one or more distance ranges.

In certain aspects, to facilitate identification of a distance range in which the UE is located, such as by a network entity, the UE is configured to send direction of arrival (DoA) information of the UE to the network entity, such as by sending signaling including an indication of a DoA of the UE to the NTN payload. The DoA information may be a DoA of downlink signals/communication received at the UE from the NTN payload. The UE may measure the DoA using an antenna array of the UE. The DoA may be indicative of a distance of the UE from the NTN payload. For example, the NTN payload, based on the DoA and an altitude of the NTN payload, and in some cases, a number of distance ranges of the coverage area of the NTN payload, may determine which distance range the UE is located within. In some cases, the NTN payload may utilize the DoA to determine a TA of the UE.

In certain aspects, the UE may be configured to report the DoA information, such as the DoA for downlink communication between the UE and the NTN payload, periodically. In certain aspects, the UE may be configured to report the DoA information when the DoA of the UE satisfies one or more thresholds associated with a current distance range the UE is within. For example, the one or more thresholds may include DoAs associated with the bounds (e.g., upper and/or lower) of the distance range, such as a first DoA and a second DoA. Reporting only when the DoA satisfies a threshold, may help reduce overhead in reporting, as compared to periodic reporting. In certain aspects, a network entity (e.g., NTN payload) is configured to send, e.g., via the NTN payload, configuration of the one or more thresholds for reporting, such as for each of one or more distance ranges.

In certain aspects, a network entity, e.g., NTN payload, is configured to determine information regarding the distance range in which the UE is located based on the network entity's own tracking, such as measurements (e.g., DoA) of one or more uplink signals/communications received at the NTN payload from the UE.

In certain aspects, the UE may send to the NTN payload a request to change the distance range associated with the UE, such as to change a minimum gap duration between downlink and uplink communications of the UE with the NTN payload. For example, the UE may track within which distance range the UE is located, such as based on position, TA, DoA, etc., and send the request when the UE changes the distance range the UE is within (e.g., based on comparison of the position, TA, and/or DoA to the aforementioned one or more thresholds configured at the UE).

In certain aspects, a network entity, such as via the NTN payload, is not configured to explicitly respond to the request to change the distance range associated with the UE from the UE. Rather, the network entity and UE may communicate assuming the change to the minimum gap duration between downlink and uplink communications of the UE with the NTN payload.

In certain aspects, a network entity, such as via the NTN payload, is configured to send to the UE a command to set/configure a minimum gap duration between uplink and downlink communication resources at the UE based on the distance range in which the UE is located (e.g., as determined by information received from the UE, or tracking by the network entity, as discussed). In certain aspects, a network entity, such as via the NTN payload, is configured to send to the UE a command to set/configure a minimum gap duration between uplink and downlink communication resources at the UE based on a request to change the minimum gap duration received from the UE.

The command may be configuration of a frame format, scheduling of resources, etc., that abide by the minimum gap duration, as discussed. The command may be an identifier of a particular distance range. In certain aspects, the network entity may configure the UE, such as through signaling sent via the NTN payload, with a configuration associating minimum gap durations with distance ranges. Accordingly, an identifier of a particular distance range may identify an associated minimum gap duration.

Example Operations

FIG. 8 shows a method 800 of wireless communications by a first apparatus, such as UE 104 of FIGS. 1 and 3, BS 102 of FIGS. 1 and 3, or a disaggregated base station discussed with respect to FIG. 2.

Method 800 begins at block 805 with communicating, during a first time period, with a second apparatus according to a first minimum gap duration between uplink and downlink communication resources configured for communication between the first apparatus and the second apparatus, wherein the first minimum gap duration is based on a relative distance between the first apparatus and the second apparatus being within a first distance range during the first time period.

Method 800 then proceeds to block 810 with communicating, during a second time period, with the second apparatus according to a second minimum gap duration between uplink and downlink communication resources configured for communication between the first apparatus and the second apparatus, wherein the second minimum gap duration is based on the relative distance between the first apparatus and the second apparatus being within a second distance range during the second time period.

In certain aspects, method 800 further includes communicating, during the first time period, an indication of a position of the first apparatus or the second apparatus.

In certain aspects, the indication of the position comprises an indication of the relative distance between the first apparatus and the second apparatus.

In certain aspects, communicating the indication of the position comprises communicating the indication of the position based on the relative distance satisfying a threshold associated with the first distance range.

In certain aspects, method 800 further includes communicating, during the first time period, an indication of a timing advance for uplink communication between the first apparatus and the second apparatus based on the timing advance satisfying a threshold associated with the first distance range.

In certain aspects, method 800 further includes communicating, during the first time period, an indication of a direction of arrival of downlink communication between the first apparatus and the second apparatus based on the direction of arrival satisfying a threshold associated with the first distance range.

In certain aspects, method 800 further includes communicating, during the first time period, a request to change a minimum gap duration between uplink and downlink communication resources configured for communication between the first apparatus and the second apparatus.

In certain aspects, method 800 further includes communicating a command to set a minimum gap duration between uplink and downlink communication resources configured for communication between the first apparatus and the second apparatus to the second minimum gap duration.

In certain aspects, method 800 further includes communicating a configuration associating the first minimum gap duration with the first distance range.

In certain aspects, method 800 further includes communicating a configuration of a plurality of minimum gap durations including the first minimum gap duration and the second minimum gap duration.

In certain aspects, method 800 further includes communicating an indication to use the first minimum gap duration.

Figure 9:
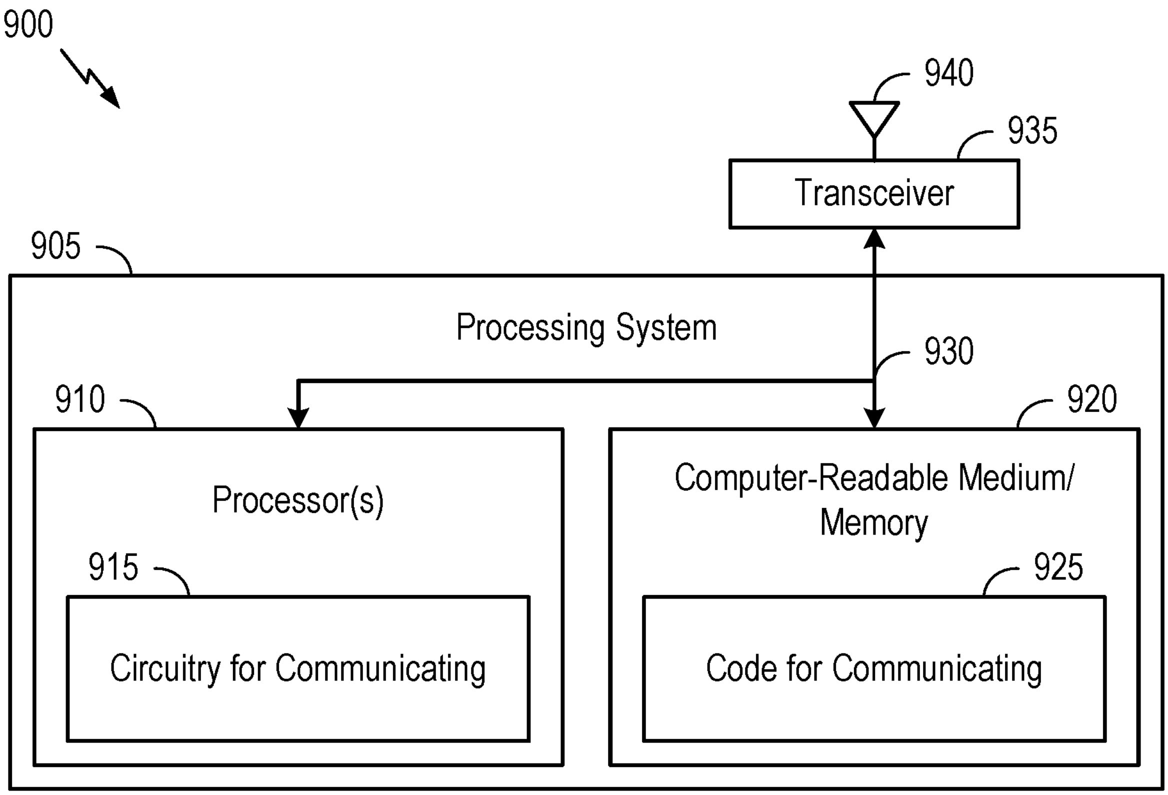
FIG. 9 depicts aspects of an example communications device.
Figure 10:
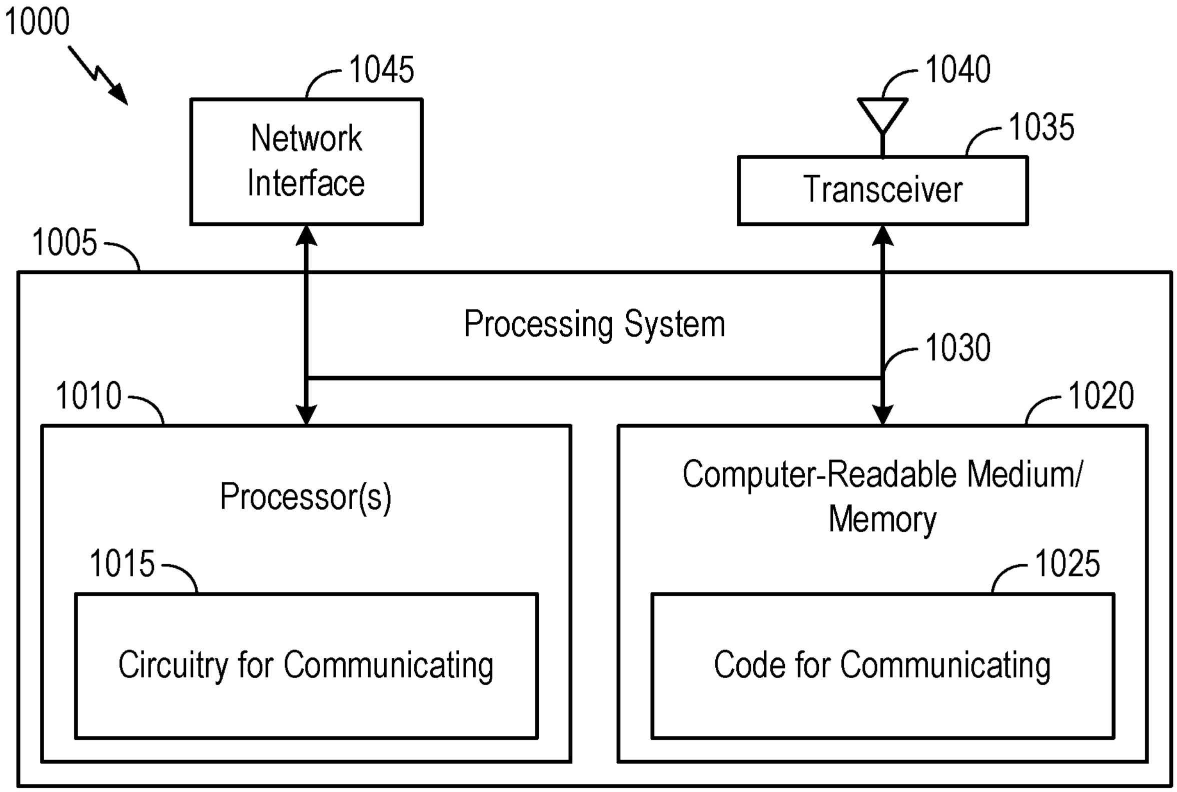
FIG. 10 depicts aspects of an example communications device.

In certain aspects, method 800, or any aspect related to it, may be performed by an apparatus, such as communications device 900 of FIG. 9 and/or communications device 1000 of FIG. 10, which include various components operable, configured, or adapted to perform the method 800. Communications device 900 and communications device 1000 are described below in further detail.

Note that FIG. 8 is just one example of a method, and other methods including fewer, additional, or alternative operations are possible consistent with this disclosure.

Example Communications Devices

FIG. 9 depicts aspects of an example communications device 900. In some aspects, communications device 900 is a user equipment, such as UE 104 described above with respect to FIGS. 1 and 3.

The communications device 900 includes a processing system 905 coupled to a transceiver 935 (e.g., a transmitter and/or a receiver). The transceiver 935 is configured to transmit and receive signals for the communications device 900 via an antenna 940, such as the various signals as described herein. The processing system 905 may be configured to perform processing functions for the communications device 900, including processing signals received and/or to be transmitted by the communications device 900.

The processing system 905 includes one or more processors 910. In various aspects, the one or more processors 910 may be representative of one or more of receive processor 358, transmit processor 364, TX MIMO processor 366, and/or controller/processor 380, as described with respect to FIG. 3. The one or more processors 910 are coupled to a computer-readable medium/memory 920 via a bus 930. In certain aspects, the computer-readable medium/memory 920 is configured to store instructions (e.g., computer-executable code) that when executed by the one or more processors 910, enable and cause the one or more processors 910 to perform the method 800 described with respect to FIG. 8, or any aspect related to it, including any operations described in relation to FIG. 8. Note that reference to a processor performing a function of communications device 900 may include one or more processors performing that function of communications device 900, such as in a distributed fashion.

In the depicted example, computer-readable medium/memory 920 stores code for communicating 925. Processing of the code for communicating 925 may enable and cause the communications device 900 to perform the method 800 described with respect to FIG. 8, or any aspect related to it.

The one or more processors 910 include circuitry configured to implement (e.g., execute) the code stored in the computer-readable medium/memory 920, including circuitry for communicating 915. Processing with circuitry for communicating 915 may enable and cause the communications device 900 to perform the method 800 described with respect to FIG. 8, or any aspect related to it.

More generally, means for communicating, transmitting, sending or outputting for transmission may include the transceivers 354, antenna(s) 352, transmit processor 364, TX MIMO processor 366, AI processor 370, and/or controller/processor 380 of the UE 104 illustrated in FIG. 3, transceiver 935 and/or antenna 940 of the communications device 900 in FIG. 9, and/or one or more processors 910 of the communications device 900 in FIG. 9. Means for communicating, receiving or obtaining may include the transceivers 354, antenna(s) 352, receive processor 358, AI processor 370, and/or controller/processor 380 of the UE 104 illustrated in FIG. 3, transceiver 935 and/or antenna 940 of the communications device 900 in FIG. 9, and/or one or more processors 910 of the communications device 900 in FIG. 9.

FIG. 10 depicts aspects of an example communications device 1000. In some aspects, communications device 1000 is a network entity, such as BS 102 of FIGS. 1 and 3, or a disaggregated base station as discussed with respect to FIG. 2.

The communications device 1000 includes a processing system 1005 coupled to a transceiver 1035 (e.g., a transmitter and/or a receiver) and/or a network interface 1045. The transceiver 1035 is configured to transmit and receive signals for the communications device 1000 via an antenna 1040, such as the various signals as described herein. The network interface 1045 is configured to obtain and send signals for the communications device 1000 via communications link(s), such as a backhaul link, midhaul link, and/or fronthaul link as described herein, such as with respect to FIG. 2. The processing system 1005 may be configured to perform processing functions for the communications device 1000, including processing signals received and/or to be transmitted by the communications device 1000.

The processing system 1005 includes one or more processors 1010. In various aspects, one or more processors 1010 may be representative of one or more of receive processor 338, transmit processor 320, TX MIMO processor 330, and/or controller/processor 340, as described with respect to FIG. 3. The one or more processors 1010 are coupled to a computer-readable medium/memory 1020 via a bus 1030. In certain aspects, the computer-readable medium/memory 1020 is configured to store instructions (e.g., computer-executable code) that when executed by the one or more processors 1010, enable and cause the one or more processors 1010 to perform the method 800 described with respect to FIG. 8, or any aspect related to it, including any operations described in relation to FIG. 8. Note that reference to a processor of communications device 1000 performing a function may include one or more processors of communications device 1000 performing that function, such as in a distributed fashion.

In the depicted example, the computer-readable medium/memory 1020 stores code for communicating 1025. Processing of the code for communicating 1025 may enable and cause the communications device 1000 to perform the method 800 described with respect to FIG. 8, or any aspect related to it.

The one or more processors 1010 include circuitry configured to implement (e.g., execute) the code stored in the computer-readable medium/memory 1020, including circuitry for communicating 1015. Processing with circuitry for communicating 1015 may enable and cause the communications device 1000 to perform the method 800 described with respect to FIG. 8, or any aspect related to it.

More generally, means for communicating, transmitting, sending or outputting for transmission may include the transceivers 332, antenna(s) 334, transmit processor 320, TX MIMO processor 330, AI processor 318, and/or controller/processor 340 of the BS 102 illustrated in FIG. 3, transceiver 1035, antenna 1040, and/or network interface 1045 of the communications device 1000 in FIG. 10, and/or one or more processors 1010 of the communications device 1000 in FIG. 10. Means for communicating, receiving or obtaining may include the transceivers 332, antenna(s) 334, receive processor 338, AI processor 318, and/or controller/processor 340 of the BS 102 illustrated in FIG. 3, transceiver 1035, antenna 1040, and/or network interface 1045 of the communications device 1000 in FIG. 10, and/or one or more processors 1010 of the communications device 1000 in FIG. 10.

Example Clauses

Implementation examples are described in the following numbered clauses:

Clause 1: A method for wireless communications by a first apparatus comprising: communicating, during a first time period, with a second apparatus according to a first minimum gap duration between uplink and downlink communication resources configured for communication between the first apparatus and the second apparatus, wherein the first minimum gap duration is based on a relative distance between the first apparatus and the second apparatus being within a first distance range during the first time period; and communicating, during a second time period, with the second apparatus according to a second minimum gap duration between uplink and downlink communication resources configured for communication between the first apparatus and the second apparatus, wherein the second minimum gap duration is based on the relative distance between the first apparatus and the second apparatus being within a second distance range during the second time period.

Clause 2: The method of Clause 1, further comprising: communicating, during the first time period, an indication of a position of the first apparatus or the second apparatus.

Clause 3: The method of Clause 2, wherein the indication of the position comprises an indication of the relative distance between the first apparatus and the second apparatus.

Clause 4: The method of Clause 2, wherein communicating the indication of the position comprises communicating the indication of the position based on the relative distance satisfying a threshold associated with the first distance range.

Clause 5: The method of any one of Clauses 1-4, further comprising: communicating, during the first time period, an indication of a timing advance for uplink communication between the first apparatus and the second apparatus based on the timing advance satisfying a threshold associated with the first distance range.

Clause 6: The method of any one of Clauses 1-5, further comprising: communicating, during the first time period, an indication of a direction of arrival of downlink communication between the first apparatus and the second apparatus based on the direction of arrival satisfying a threshold associated with the first distance range.

Clause 7: The method of any one of Clauses 1-6, further comprising: communicating, during the first time period, a request to change a minimum gap duration between uplink and downlink communication resources configured for communication between the first apparatus and the second apparatus.

Clause 8: The method of any one of Clauses 1-7, further comprising: communicating a command to set a minimum gap duration between uplink and downlink communication resources configured for communication between the first apparatus and the second apparatus to the second minimum gap duration.

Clause 9: The method of any one of Clauses 1-8, further comprising: communicating a configuration associating the first minimum gap duration with the first distance range.

Clause 10: The method of any one of Clauses 1-9, further comprising: communicating a configuration of a plurality of minimum gap durations including the first minimum gap duration and the second minimum gap duration.

Clause 11: The method of Clause 10, further comprising: communicating an indication to use the first minimum gap duration.

Clause 12: One or more apparatuses, comprising: one or more memories comprising executable instructions; and one or more processors configured to execute the executable instructions and cause the one or more apparatuses to perform a method in accordance with any one of Clauses 1-11.

Clause 13: One or more apparatuses, comprising: one or more memories; and one or more processors, coupled to the one or more memories, configured to cause the one or more apparatuses to perform a method in accordance with any one of Clauses 1-11.

Clause 14: One or more apparatuses, comprising: one or more memories; and one or more processors, coupled to the one or more memories, configured to perform a method in accordance with any one of Clauses 1-11.

Clause 15: One or more apparatuses, comprising means for performing a method in accordance with any one of Clauses 1-11.

Clause 16: One or more non-transitory computer-readable media comprising executable instructions that, when executed by one or more processors of one or more apparatuses, cause the one or more apparatuses to perform a method in accordance with any one of Clauses 1-11.

Clause 17: One or more computer program products embodied on one or more computer-readable storage media comprising code for performing a method in accordance with any one of Clauses 1-11.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, an AI processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather "one or more." The subsequent use of a definite article (e.g., "the" or "said") with an element (e.g., "the processor") is not intended to invoke a singular meaning (e.g., "only one") on the element unless otherwise specifically stated. For example, reference to an element (e.g., "a processor," "a controller," "a memory," "a transceiver," "an antenna," "the processor," "the controller," "the memory," "the transceiver," "the antenna," etc.), unless otherwise specifically stated, should be understood to refer to one or more elements (e.g., "one or more processors," "one or more controllers," "one or more memories," "one more transceivers," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. A first apparatus configured for wireless communications, comprising:

one or more memories comprising processor-executable instructions; and one or more processors configured to execute the processor-executable instructions and cause the first apparatus to:

communicate, during a first time period, with a second apparatus according to a first minimum gap duration between uplink and downlink communication resources configured for communication between the first apparatus and the second apparatus, wherein the first minimum gap duration is based on a relative distance between the first apparatus and the second apparatus being within a first distance range during the first time period; and communicate, during a second time period, with the second apparatus according to a second minimum gap duration between uplink and downlink communication resources configured for communication between the first apparatus and the second apparatus, wherein the second minimum gap duration is based on the relative distance between the first apparatus and the second apparatus being within a second distance range during the second time period.

2. The first apparatus of claim 1, wherein the one or more processors are configured to cause the first apparatus to:

communicate, during the first time period, an indication of a position of the first apparatus or the second apparatus.

3. The first apparatus of claim 2, wherein the indication of the position comprises an indication of the relative distance between the first apparatus and the second apparatus.

4. The first apparatus of claim 2, wherein to communicate the indication of the position comprises to communicate the indication of the position based on the relative distance satisfying a threshold associated with the first distance range.

5. The first apparatus of claim 1, wherein the one or more processors are configured to cause the first apparatus to:

communicate, during the first time period, an indication of a timing advance for uplink communication between the first apparatus and the second apparatus based on the timing advance satisfying a threshold associated with the first distance range.

6. The first apparatus of claim 1, wherein the one or more processors are configured to cause the first apparatus to:

communicate, during the first time period, an indication of a direction of arrival of downlink communication between the first apparatus and the second apparatus based on the direction of arrival satisfying a threshold associated with the first distance range.

7. The first apparatus of claim 1, wherein the one or more processors are configured to cause the first apparatus to:

communicate, during the first time period, a request to change a minimum gap duration between uplink and downlink communication resources configured for communication between the first apparatus and the second apparatus.

8. The first apparatus of claim 1, wherein the one or more processors are configured to cause the first apparatus to:

communicate a command to set a minimum gap duration between uplink and downlink communication resources configured for communication between the first apparatus and the second apparatus to the second minimum gap duration.

9. The first apparatus of claim 1, wherein the one or more processors are configured to cause the first apparatus to:

communicate a configuration associating the first minimum gap duration with the first distance range.

10. The first apparatus of claim 1, wherein the one or more processors are configured to cause the first apparatus to:

communicate a configuration of a plurality of minimum gap durations including the first minimum gap duration and the second minimum gap duration.

11. The first apparatus of claim 10, wherein the one or more processors are configured to cause the first apparatus to:

communicate an indication to use the first minimum gap duration.

12. A method for wireless communications by a first apparatus comprising:

communicating, during a first time period, with a second apparatus according to a first minimum gap duration between uplink and downlink communication resources configured for communication between the first apparatus and the second apparatus, wherein the first minimum gap duration is based on a relative distance between the first apparatus and the second apparatus being within a first distance range during the first time period; and communicating, during a second time period, with the second apparatus according to a second minimum gap duration between uplink and downlink communication resources configured for communication between the first apparatus and the second apparatus, wherein the second minimum gap duration is based on the relative distance between the first apparatus and the second apparatus being within a second distance range during the second time period.

13. The method of claim 12, further comprising:

communicating, during the first time period, an indication of a position of the first apparatus or the second apparatus.

14. The method of claim 12, further comprising:

communicating, during the first time period, an indication of a timing advance for uplink communication between the first apparatus and the second apparatus based on the timing advance satisfying a threshold associated with the first distance range.

15. The method of claim 12, further comprising:

communicating, during the first time period, an indication of a direction of arrival of downlink communication between the first apparatus and the second apparatus based on the direction of arrival satisfying a threshold associated with the first distance range.

16. The method of claim 12, further comprising:

communicating, during the first time period, a request to change a minimum gap duration between uplink and downlink communication resources configured for communication between the first apparatus and the second apparatus.

17. The method of claim 12, further comprising:

communicating a command to set a minimum gap duration between uplink and downlink communication resources configured for communication between the first apparatus and the second apparatus to the second minimum gap duration.

18. The method of claim 12, further comprising:

communicating a configuration associating the first minimum gap duration with the first distance range.

19. The method of claim 12, further comprising:

communicating a configuration of a plurality of minimum gap durations including the first minimum gap duration and the second minimum gap duration.

20. The method of claim 19, further comprising:

communicating an indication to use the first minimum gap duration.

* * * * *